(12) United States Patent
Tang et al.

(10) Patent No.: US 11,528,702 B2
(45) Date of Patent: Dec. 13, 2022

(54) CHANNEL STRUCTURE DESIGN FOR V2X COMMUNICATION

(71) Applicant: MEDIATEK SINGAPORE PTE. LTD., Singapore (SG)

(72) Inventors: Zhixun Tang, Beijing (CN); Tao Chen, Beijing (CN); Min Lei, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 109 days.

(21) Appl. No.: 16/993,829

(22) Filed: Aug. 14, 2020

(65) Prior Publication Data
US 2021/0092737 A1    Mar. 25, 2021

Related U.S. Application Data

(63) Continuation of application No. PCT/CN2019/101010, filed on Aug. 16, 2019, and a continuation of application No. PCT/CN2019/100784, filed on Aug. 15, 2019.

(30) Foreign Application Priority Data

Aug. 4, 2020   (CN) .......................... 202010771706.3

(51) Int. Cl.
*H04W 72/04*      (2009.01)
*H04W 4/40*       (2018.01)

(52) U.S. Cl.
CPC ......... *H04W 72/0446* (2013.01); *H04W 4/40* (2018.02); *H04W 72/0406* (2013.01)

(58) Field of Classification Search
CPC ......... H04W 4/40–48; H04W 72/0406; H04W 72/0446; H04W 72/0413–0433
See application file for complete search history.

(56) References Cited

U.S. PATENT DOCUMENTS

2021/0029688 A1 *  1/2021  Zhang ............... H04W 4/40
2021/0076341 A1 *  3/2021  Si ..................... H04L 5/005

FOREIGN PATENT DOCUMENTS

WO    WO-2020156429 A1 *  8/2020 ........... H04L 1/1896

* cited by examiner

*Primary Examiner* — Thomas R Cairns
(74) *Attorney, Agent, or Firm* — Oblon, McClelland, Maier & Neustadt, L.L.P.

(57) ABSTRACT

Aspects of the disclosure provide an apparatus, which can include a receiving circuitry and a processing circuitry. The receiving circuitry can be configured to receive a configuration indicating that a preconfigured number of consecutive symbols within a slot are used for a sidelink transmission. The receiving circuitry can be further configured to receive the sidelink transmission over the preconfigured number of consecutive symbols within the slot. The processing circuitry can be configured to process a data transmission of the sidelink transmission received over the preconfigured number of consecutive symbols within the slot. Aspects of the disclosure also provide a method.

16 Claims, 6 Drawing Sheets

CHANNEL STRUCTURE DESIGN FOR V2X COMMUNICATION

INCORPORATION BY REFERENCE

This present disclosure claims the priorities of PCT/CN2019/100784, titled "CHANNEL STRUCTURE DESIGN FOR V2X COMMUNICATION" filed on Aug. 15, 2019, PCT/CN2019/101010, titled "SSB DESIGN FOR V2X COMMUNICATION" filed on Aug. 16, 2019, and Chinese Patent Application No. 202010771706.3 filed on Aug. 4, 2020, which are incorporated herein by reference in its entirety.

TECHNICAL FIELD

The present disclosure relates to wireless communications and, more particularly, to a method and an apparatus for channel structure designs.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Support for direct device-to-device (D2D) connectivity between two user equipment (UEs) without signal relay through a base station (BS) was first introduced for public safety in Release 12 of the Third Generation Partnership Project (3GPP) Long-Term Evolution (LTE) specifications. Sidelink transmissions in Release 13 support UE-to-Network relay, in which an in-coverage UE is able to relay signals between an eNB and an out-of-coverage UE. In Release 14, the scenario of sidelink transmissions is extended from D2D proximity service (ProSe) solely for public safety to vehicle-to-everything (V2X). As the evolution of Release 14 continues, 3GPP in Release 15 adopted new functions such as carrier aggregation (CA) and transmission diversity. 3GPP New Radio (NR) in Release 16 continues the evolution of sidelink transmissions, and supports a number of new sidelink functions not provided in the LTE and LTE-Advanced (LTE-A), including the feedback channel, grant-free access, enhanced channel sensing procedure, and new control channel design. When the UEs are vehicles, the D2D communication may be referred to as vehicle-to-vehicle (V2V) communication. Other vehicle-based UE communications may include vehicle-to-everything (V2X), vehicle-to-infrastructure (V2I), vehicle-to-pedestrian (V2P), and vehicle-to-network (V2N).

In addition to the bands already used for previous generations, e.g., 2100 MHz for 3G and 600 MHz, 1.7/2.1 GHz, 2.3 GHz and 2.5 GHz for 4G LTE, frequency bands above 24 GHz have been used by 5G NR as a complement to the frequency bands below 6 GHz. With the 5G NR requirements for very high data rates, deployment using even higher frequencies, above 60 GHz for example, are also considered. Referring to the wavelength, these bands are often called mm-wave bands. As NR spans such a vast range of frequencies, there are certain provisions that are intended only for certain frequency ranges. This includes how the different NR numerologies can be applied. 3GPP in Release 15 divides NR frequency bands into two frequency ranges: frequency range 1 (FR1) includes all existing and new bands below 6 GHZ; and frequency range 2 (FR2) includes new bands in the range 24.25 to 52.6 GHz.

SUMMARY

Aspects of the disclosure provide a method, which can include receiving, at a user equipment (UE), a configuration indicating a preconfigured number of consecutive symbols within a slot are used for a sidelink transmission. The method can further include receiving from another UE the sidelink transmission over the preconfigured number of consecutive symbols within the slot. The method can also include processing a data transmission of the sidelink transmission received over the preconfigured number of consecutive symbols within the slot.

In some embodiments, the remaining symbol(s) within the slot are used for guard period(s) (GP(s)) and located at last symbol(s) of the slot. For example, the data transmission of the sidelink transmission located at the first symbol of the slot can be used for automatic gain control (AGC). For example, the slot can be a sidelink synchronization signal (SLSS) slot, and the data transmission can include two symbols of sidelink primary synchronization signal (S-PSS) located at the second and third symbols of the slot and two symbols of sidelink secondary synchronization signal (S-SSS) located at the fourth and fifth symbols of the slot. In some embodiments, the slot can be a sidelink data slot, and the method can further include performing another sidelink transmission over the preconfigured number of consecutive symbols within the slot, a data transmission to yet another UE of the another sidelink transmission including physical sidelink feedback channel (PSFCH) located at the second and third to last symbols of the slot. For example, the another UE can be the same as the yet another UE. As another example, the another UE can be different from the yet another UE. In other embodiments, the method can also include performing a sidelink received signal strength indicator (S-RSSI) measurement on the data transmission of the slot excluding the PSFCHs. In some embodiments, the configuration can be received from a base station (BS), and be included in a radio resource control (RRC) message or a media access control-control element (MAC-CE), or signaled by downlink control information (DCI). In some other embodiments, the configuration can be received from the another UE, and be signaled by sidelink control information (SCI). For example, the preconfigured number can be between 7 and 14.

Aspects of the disclosure further provide an apparatus. For example, the apparatus can include receiving circuitry and processing circuitry. The receiving circuitry can be configured to receive a configuration indicating that a preconfigured number of consecutive symbols within a slot are used for a sidelink transmission, and receive the sidelink transmission over the preconfigured number of consecutive symbols within the slot. The processing circuitry can be configured to process a data transmission of the sidelink transmission over the preconfigured number of consecutive symbols within the slot.

In some embodiments, the slot can be a sidelink data slot, and the receiving circuitry can be further configured to perform another sidelink transmission over the preconfigured number of consecutive symbols within the slot. For example, the data transmission to yet another sidelink transmission can include PSFCH located at the second and third to last symbols of the slot.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

According to some embodiments of the disclosure, a preconfigured number of consecutive symbols within a slot are used for a sidelink transmission, and the remaining symbols within the slot can be used for guard periods (GPs). As the number of symbols used for a sidelink transmission and the number of GPs are configurable, based on, for example, a timing advance (TA) value associated with an uplink transmission, the sidelink transmission can be prevented from colliding with the uplink transmission.

Figure 1:
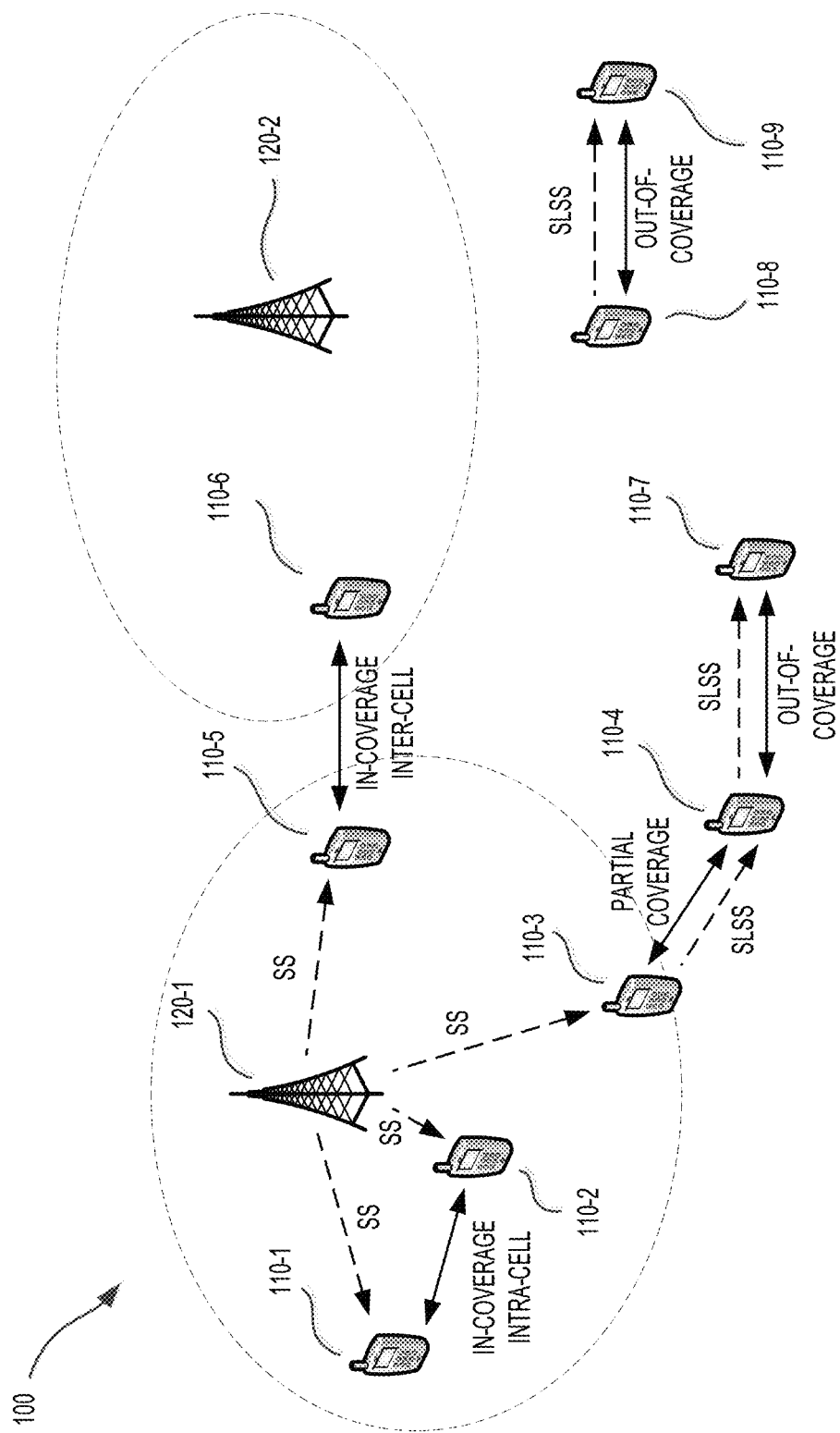
FIG. 1 shows an exemplary wireless communication system according to some embodiments of the disclosure.

FIG. 1 shows an exemplary wireless communication system 100 according to some embodiments of the disclosure. The wireless communication system 100 can include base stations (BSs) 120-1 and 120-2 and user equipments (UEs) 110-1 to 110-9. The BSs 120 can include eNBs and/or gNBs. For example, the BS 120-1 is an eNB and the BS 120-2 is a gNB; the BS 120-1 is a gNB and the BS 120-2 is an eNB; both the BSs 120-1 and 120-2 are an eNB; or both the BSs 120-1 and 120-2 are a gNB. The UEs 110 can be a vehicle, a computer, a mobile phone, and the like. The UEs 110 can communicate with the BSs 120. For example, the UEs 110-1 to 110-3 can communicate with the BS 120-1, and the UE 110-6 can communicate with the BS 120-2. The UEs 110 can also involve in direct sidelink connectivity with one another. For example, the UEs 110-5 and 110-6 can involve in direct sidelink connectivity. The BSs 120 may be or may be not synchronized.

UEs involved in sidelink connectivity may be under network coverage (i.e., "in-coverage"). For example, the UEs 110-1, 110-2 and 110-5 are in-coverage of the BS 120-1, and the UE 110-6 is in-coverage of the BS 120-2. Sidelink connectivity is also possible for UEs outside of network coverage (i.e., "out-of-coverage"). For example, the out-of-coverage UEs 110-4 and 110-7 and UEs 110-8 and 110-9 can establish their respective sidelink connectivity, respectively. Sidelink connectivity can also be established when some UEs involved in sidelink connectivity are in-coverage and some other UEs are out-of-coverage (i.e., "partial coverage"). For example, the in-coverage UE 110-3 can establish sidelink connectivity with the out-of-coverage UE 110-4. For the in-coverage scenario, the UEs receiving a sidelink transmission and the transmitting UE may be within the same cell ("intra-cell") or in different cells ("inter-cell"). For example, the in-coverage UEs 110-1 and 110-2 are within the same cell, while the in-coverage UEs 110-5 and 110-6 are within different cells associated with the BSs 120-1 and 120-2, respectively. For in-coverage UEs, sidelink connectivity can take place in a radio resource control (RRC) connected state. However, sidelink connectivity can also take place in an RRC idle state.

Before establishing sidelink connectivity, the UEs 110-1 to 110-9 should be well synchronized to one another, or to the overlaid network if present. A UE that is in-coverage or out-of-coverage will have different mechanisms of acquiring transmission timings and configuration parameters that are needed for proper sidelink connectivity. In-coverage UEs can use a synchronization signal (SS), including a primary synchronization signal (PSS) and a secondary synchronization signal (SSS), of a serving cell when they are in the RRC connected state or a cell they are camping on when they are in the RRC idle state as a timing reference for their sidelink transmissions. For example, the UEs 110-1 to 110-3 and 110-5 can receive the SS from the BS 120-1 and be synchronized thereto. The BS 120-1 may be referred to as a synchronization reference source for the UEs 110-1 to 110-3 and 110-5. Out-of-coverage UEs can acquire their transmission timing from a sidelink SS (SLSS) transmitted by other UEs, which are referred to as synchronization reference UEs (SyncRef UEs). Similar to the SS, the SLSS also covers the 127 center subcarriers of the 11 or 12 resource blocks (RBs). The SLSS includes a sidelink primary synchronization signal (S-PSS) and a sidelink secondary synchronization signal (S-SSS). Different from the PSS and SSS, each of which occupies only one orthogonal frequency-division multiplexing (OFDM) symbol in time, the S-PSS and the S-SSS each occupy two consecutive OFDM symbols, as the sidelink channel conditions may be more severe than the channel conditions in conventional mobile communication systems. For example, the multipath fading and the fast fading due to the Doppler effect may be more pronounced in sidelink communication channels. The two S-PSS symbols are identical and are generated in the similar way as the PSS. Unlike 4G LTE, the 5G NR S-PSS consists of one of three different 127-symbols m-sequences. The two S-SSS symbols are also identical and are generated in the similar way as the SSS.

Figure 2:
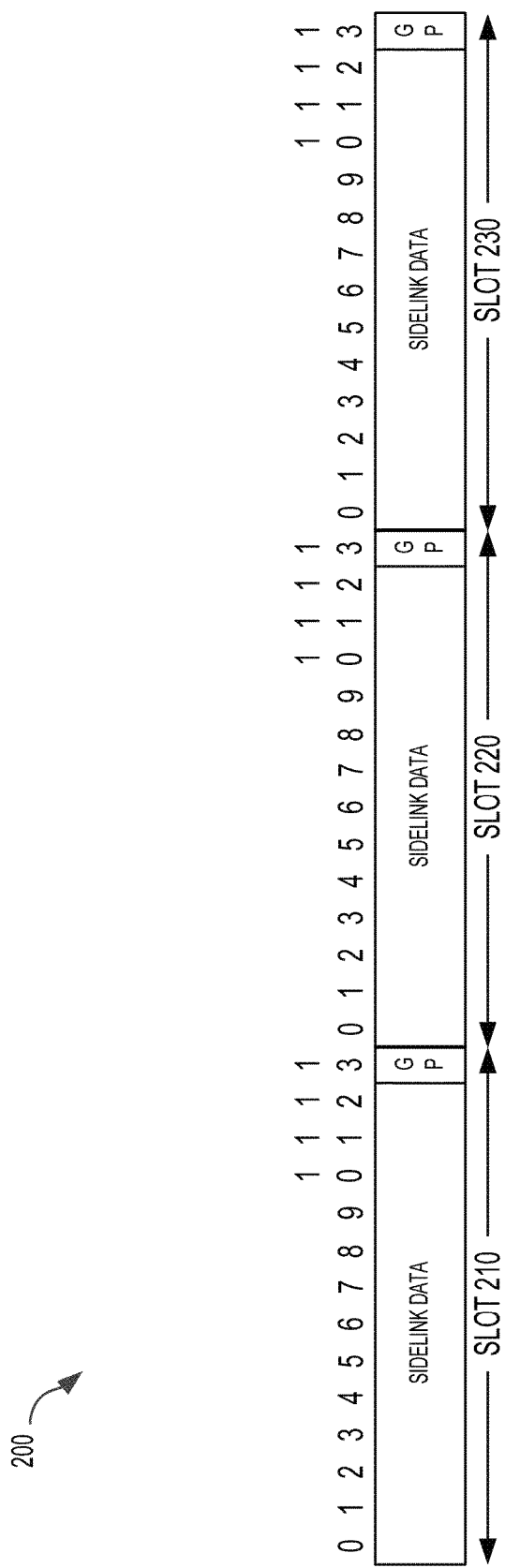
FIG. 2 shows an exemplary sidelink transmission including three consecutive sidelink slots according to some embodiments of the disclosure.

Sidelink connectivity takes place in the uplink band. A guard period (GP) is created by allowing a UE to skip receiving the last several symbols in a sidelink slot immediately preceding an uplink slot, to cover the RF switching time required by the UE to switch the sidelink connectivity to the uplink connectivity and avoid the sidelink transmission from colliding with the uplink transmission. As the GP is created to prevent the current sidelink transmission from colliding with the next uplink transmission, it is suggested that such the sidelink slot having the last several symbols used for the GPs are used when the UE switches its active sidelink bandwidth part (BWP) to a Uu BWP. For example, as shown in FIG. 2 when consecutive sidelink slots 210-230 are included in a sidelink transmission 200, each of the sidelink slots 210-230 can include only one last symbol used for the GP. Therefore, a sidelink service can be scheduled with consecutive slots to a UE for spectrum efficiency.

Signals transmitted from different UEs at different locations within a cell are required to arrive at a BS approximately at the same time, or they will cause interference to one another. The network can control the timing of signals received at the BS from the UEs at different locations by providing the UEs with different timing advances (TAs). A TA is an offset, at a UE, between the start of a received sidelink slot and a nearest transmitted uplink slot. UEs far from the BS (e.g., the UE 110-3) encounter a larger propagation delay and thus need to start their uplink transmissions somewhat in advance, compared to UEs closer to the BS (e.g., the UE 110-2). Therefore, for a UE far from the BS and experiencing a large propagation delay a large value of TA offset is required to ensure the control timing at the BS. The TA value for each UE is determined by the network based on measurements on the respective uplink transmissions. As long as a UE performs an uplink transmission, the BS can use this as a source to estimate the uplink receiving timing and correct the TA for each UE by issuing a TA command. In order to avoid the timing-advanced uplink transmission from colliding with the sidelink transmission, the GP is required to further cover the TA offset of the uplink transmission.

Table 1 lists the BS coverage with sidelink GP of different numbers of symbols.

TABLE 1

|  | SCS (KHz) | Symbol (μs) | BWP switching (μs) | TAoffset (μs) | Permit TA/2 (μs) | Coverage (km) | GP symbol number |
|---|---|---|---|---|---|---|---|
| LTE | 15 | 71.3 | 20 | 20 | 31.3 | 9.39 | 1 |
| NR FR1 | 15 | 71.3 | 20 | 13 | 38.3 | 11.49 | 1 |
|  | 30 | 35.7 | 20 | 13 | 2.7 | 0.81 | 2 |
|  | 60 | 17.8 | 20 | 13 | −15.2 | −4.56 | 3-4 |
| Coexist with TDD LTE in FR1 | 15 | 71.3 | 20 | 20 | 31.3 | 9.39 | 1 |
|  | 30 | 35.7 | 20 | 20 | −4.3 | −1.29 | 2 |
|  | 60 | 17.8 | 20 | 20 | −22.2 | −6.66 | 3-4 |
| NR FR2 | 60 | 17.8 | 20 | 7 | −9.2 | −2.76 | 2 |
|  | 120 | 8.9 | 20 | 7 | −18.1 | −5.43 | 4 |

As the last SL symbols for different numerologies have different lengths, the permitted BS coverage, which is limited by SL symbol length, will change. In legacy LTE, the permitted BS coverage is about 9.39 km with the sidelink GP of one symbol. By contrast, in NR as the sidelink GP of one symbol is shorter when subcarrier spacing (SCS) is 30 KHz, 60 KHz and 120 KHz than the sidelink GP of one symbol when SCS is 15 KHz, the permitted BS coverage would be a problem as SCS increases. For example, although the permitted BS coverage (i.e., 11.49 km) is still slightly larger than 9.39 km in the legacy LTE when SCS is 15 KHz, the permitted BS coverage is extremely small (i.e., 0.81 km) when SCS is 30 KHz, or even becomes negative (i.e., −4.56 km) when SCS is increased to 60 KHz. Therefore, a larger number of symbols are required to be used for GPs within a slot when SCS is 30 KHz or 60 KHz, in order to have a permitted BS coverage that is similar in size to the permitted BS coverage in LTE. For example, in FR1 when SCS is 30 KHz and 60 KHz the sidelink GP length can be 2 and 4 symbols, respectively, and in FR2 when SCS is 60 KHz and 120 KHz the sidelink GP length can be 2 and 4 symbols, respectively.

Figure 3:
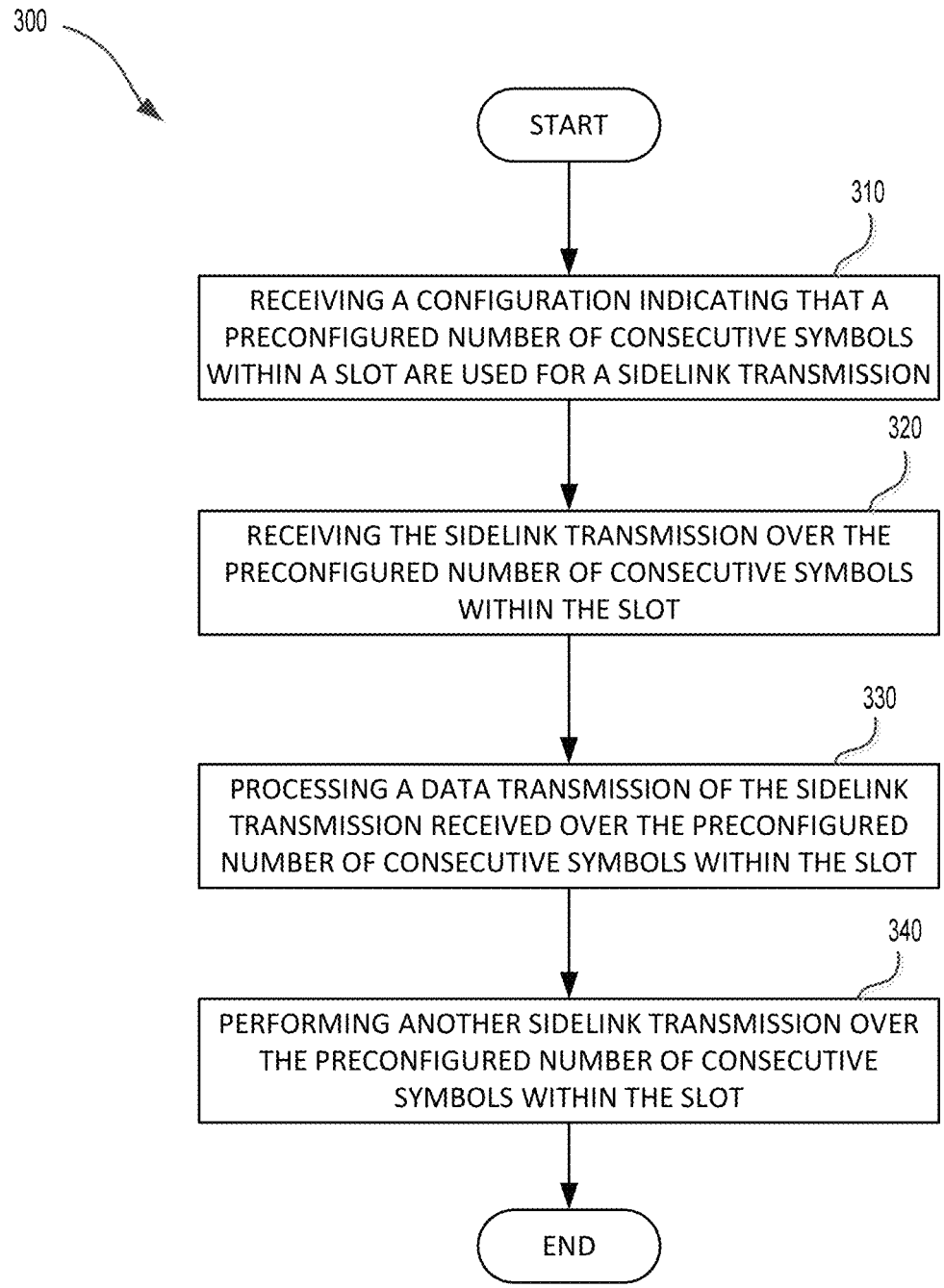
FIG. 3 shows a flow chart of an exemplary method according to some embodiments of the disclosure.

FIG. 3 shows a flow chart of an exemplary method 300 according to some embodiments of the disclosure. In order to sustain a substantially large enough permitted coverage in NR, in the method 300 a number of consecutive symbols within a slot used for a sidelink transmission can be configurable, and a UE can receive a sidelink transmission including such a slot, remaining symbols of which can be used for GPs. As the network can have the knowledge of the measurements on the respective uplink transmissions and determine a corresponding TA value for the UE, it can configure an appropriate number of consecutive symbols within a sidelink transmission slot, to ensure that the sidelink transmission will not collide with the uplink transmission. In various embodiments, some of the steps of the method 300 shown can be performed concurrently or in a different order than shown, can be substituted by other method steps, or can be omitted. Additional method steps can also be performed as desired. Aspects of the method 300 can be implemented by a wireless device, such as the UEs 110 illustrated in and described with respect to the preceding figures.

At step 310, a UE (e.g., the UE 110-3) can receive a configuration indicating that a preconfigured number of consecutive symbols within a slot are used for a sidelink transmission. In some embodiments, the configuration can be received from a BS (e.g., the BS 120-1), and included in an RRC message or a media access control-control element (MAC-CE), or signaled by downlink control information (DCI). In other embodiments, the configuration can be received from another UE (e.g., the UE 110-4), and signaled by sidelink control information (SCI). In various embodiments, the UE 110-3 can be preconfigured a slot configuration first, and then receive the configuration indicating a preconfigured number that is different from a number of consecutive symbols of the slot configuration. For example, the UE 110-4 can be preconfigured the slot configuration based on carriers with different SCSs as listed in table 2.

TABLE 2

|  | SCS (KHz) | Consecutive symbol number | SL GP number |
|---|---|---|---|
| NR FR1 | 15 | 13 | 1 |
|  | 30 | 12 | 2 |
|  | 60 | 10 | 4 |
| Coexist with TDD LTE in FR1 | 15 | 13 | 1 |
|  | 30 | 12 | 2 |
|  | 60 | 10 | 4 |
| NR FR2 | 60 | 12 | 2 |
|  | 120 | 10 | 4 |

At step 320, the UE 110-3 can receive from the UE 110-4 the sidelink transmission over the preconfigured number of consecutive symbols within the slot. For example, the remaining symbol(s) within the slot can be used for GP(s) and located at last symbol(s) of the slot. At step 330, the UE 110-3 can process a data transmission of the sidelink transmission received over the preconfigured number of symbols within the slot.

At step 340, the UE 110-3 can further perform another sidelink transmission over the preconfigured number of consecutive symbols within the slot. In some embodiments, a data transmission to yet another sidelink UE can include at least one symbol of physical sidelink feedback channel (PSFCH), which is designed to convey sidelink feedback control information (SFCI) (i.e., hybrid automatic repeat request (HARD) acknowledgement/negative acknowledgement (ACK/NACK)) for unicast and groupcast, to enable feedback-based re-transmissions and channel state information acquisition. For example, the data transmission to yet another sidelink UE can include two PSFCH symbols located at the second and third to last symbols of the slot. For example, the another UE (the UE 110-4) can be or not be the same as the yet another UE. In some embodiment, the UE 110-3 can perform a sidelink received signal strength indicator (S-RSSI) measurement (e.g., channel busy rate (CBR)) on the slot at least excluding the PSFCHs. The PSFCH can be located at the second and third to last symbols of every one, two or four slots.

Figure 4A:
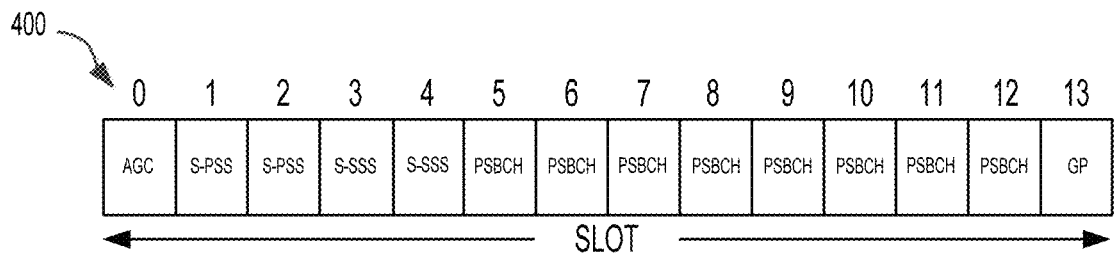
FIGS. 4A-4C and 5A-5D show exemplary slots having a number of consecutive symbols that is preconfigurable according to some embodiments of the disclosure.
Figure 4B:
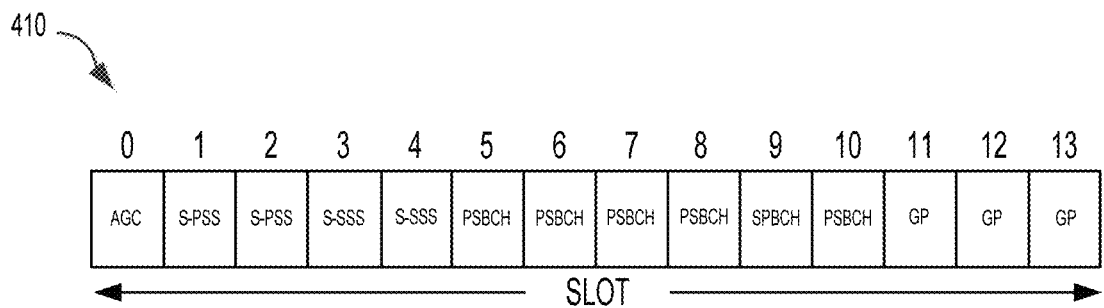
Figure 4C:
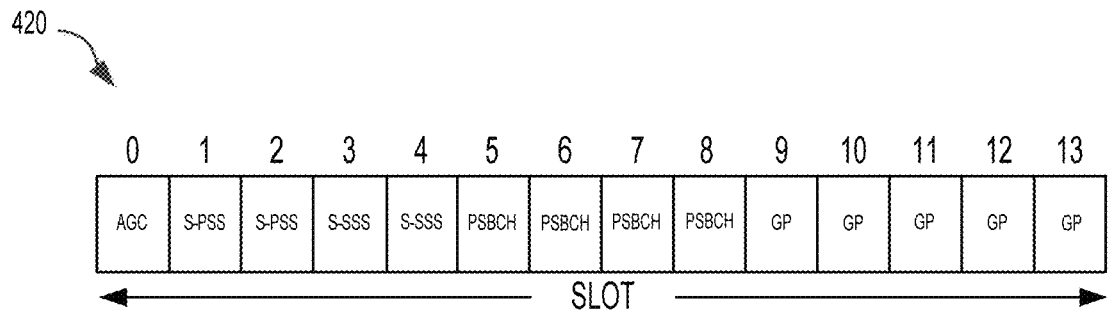
Figure 5A:
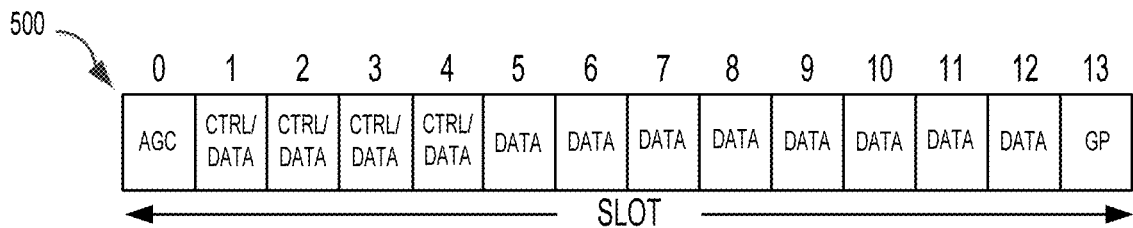
Figure 5B:
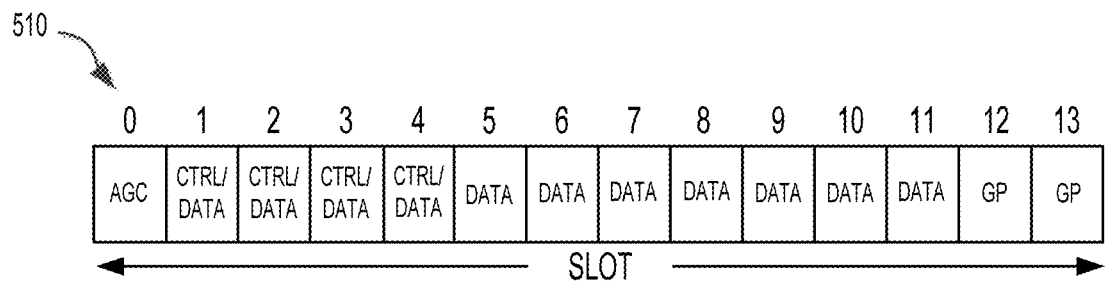
Figure 5C:
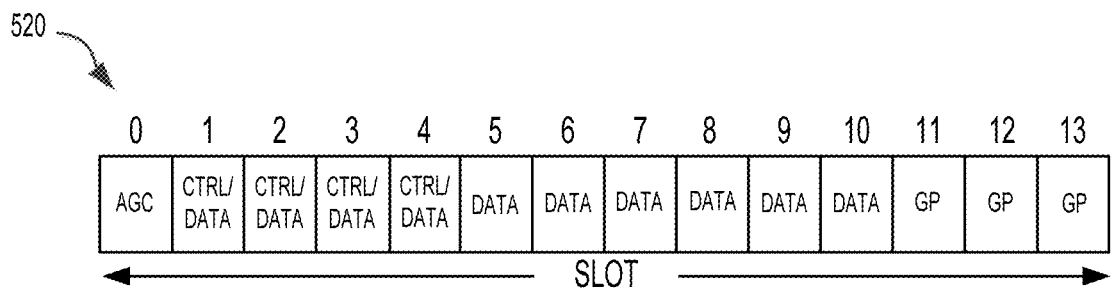
Figure 5D:
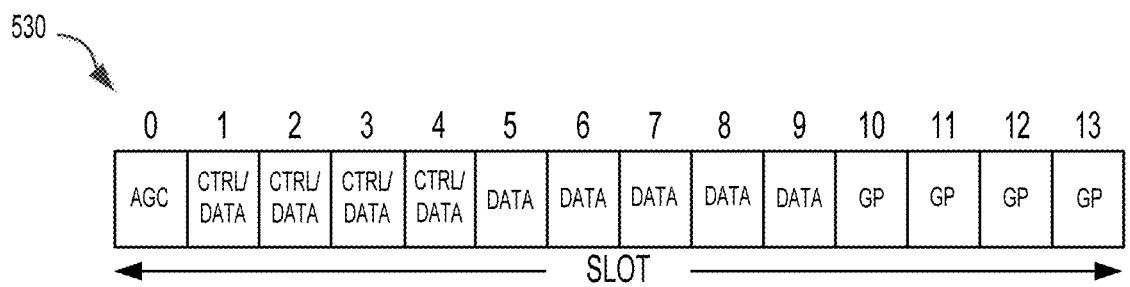

FIGS. 4A-4C and 5A-5D show exemplary slots 400-420 and 500-530 having a preconfigured number of consecutive symbols used for a sidelink transmission according to some embodiments of the disclosure. In some embodiments, the remaining symbols within the slot can be used for GPs. For example, the preconfigured number can be 13, as shown in FIGS. 4A and 5A, can be 12, as shown in FIG. 5B, can be 11, as shown in FIGS. 4B and 5C, can be 10, as shown in FIG. 5D, or can be 9, as shown in FIG. 4C. In some embodiments, the preconfigured number can be 7, 8 or 14. In the example shown in FIGS. 4A-4C and 5A-5D, the GP(s) is located at the last symbol(s) of each of the slots 400-420 and 500-530, and the data transmission of the sidelink transmission located at the first symbol of the each of the slots 400-420 and 500-530 can be used for automatic gain control (AGC). In some embodiments, the sidelink transmission can be an SLSS. For example, the slots 400-420 can be SLSS slots, and the data transmission can include two symbols of sidelink primary synchronization signal (S-PSS) located at the second and third symbols of each of the slots 400-420 and two symbols of S-SSS located at the fourth and fifth symbols of each of the slots 400-420, as shown in FIGS. 4A-4C. In other embodiments, the sidelink transmission can include control/data only, without sidelink SS blocks. For example, the slots 500-530 can be sidelink data slots, and the data transmission can include control/data located at the second to fifth symbols of each of the slots 500-530 and data located from the sixth symbol of each of the slots 500-530, as shown in FIGS. 5A-5D.

The sidelink transmission can include a plurality of symbols of physical sidelink broadcast channel (PSBCH). For example, as shown in FIG. 4A, the sidelink transmission can include four symbols of PSBCH of a first pattern located at the sixth to ninth symbols and four symbols of PSBCH of a second pattern located at the tenth to thirteenth symbols when the sidelink transmission includes one symbol of GP. In another example, the sidelink transmission can include eight symbols of PBSCH located from the sixth to thirteenth symbols. As shown in FIG. 4B, the sidelink transmission can include three symbols of PSBCH of a first pattern located at the sixth to eighth symbols and three symbols of PSBCH of a second pattern located at the ninth to eleventh symbols when the sidelink transmission includes three symbols of GP. In another example, the sidelink transmission can include sixth symbols of PBSCH located from the sixth to eleventh symbols. As shown in FIG. 4C, the sidelink transmission can include two symbols of PSBCH of a first pattern located at the sixth and seventh symbols, respectively, and two symbols of PSBCH of a second pattern located at the eighth and ninth symbols, respectively, when the sidelink transmission includes five symbols of GP. In another example, the sidelink transmission can include four symbols of PBSCH located from the sixth to ninth symbols.

Figure 6:
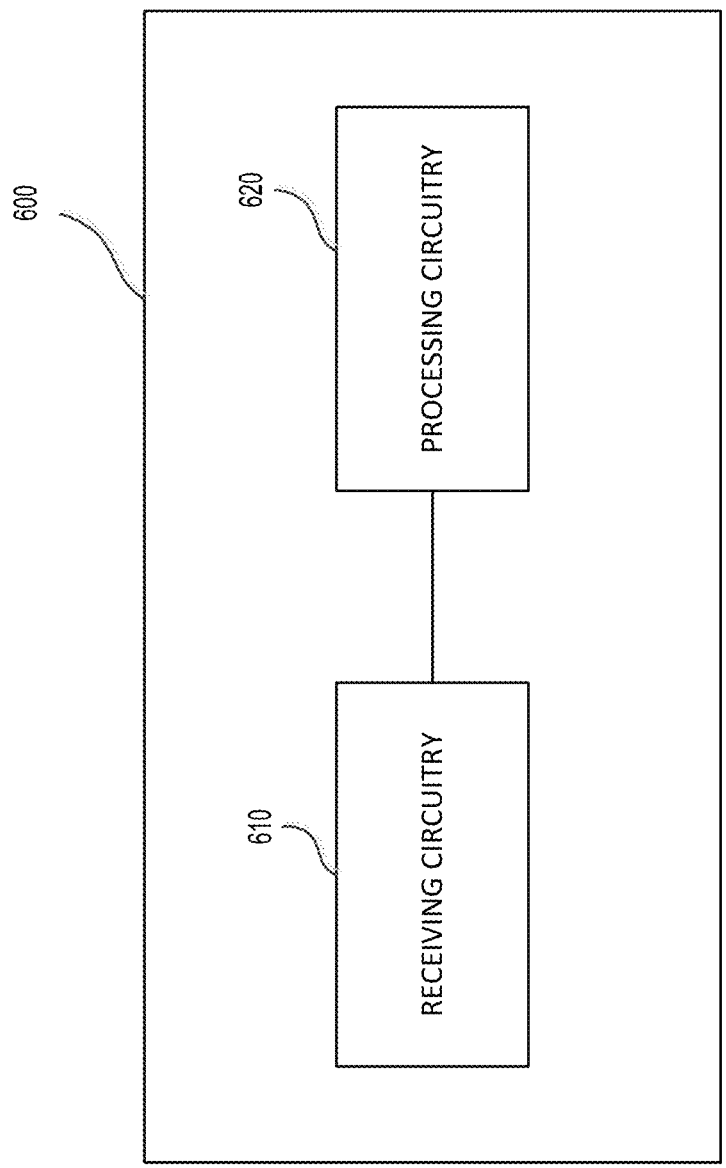
FIG. 6 shows a functional block diagram of an exemplary apparatus according to some embodiments of the disclosure.

FIG. 6 shows a functional block diagram of an exemplary apparatus 600 according to some embodiments of the disclosure. The apparatus 600 can be configured to perform various functions in accordance with one or more embodiments or examples described herein. Thus, the apparatus 600 can provide means for implementation of mechanisms, techniques, processes, functions, components or systems described herein. For example, the apparatus 600 can be used to implement functions of the UEs 110-1 to 110-9 in various embodiments and examples described herein. The apparatus 600 can include a general purpose processor or specifically designed circuits to implement various functions, components or processes described herein in various embodiments. In an embodiment, the apparatus 600 can include receiving circuitry 610 and processing circuitry 620.

In an embodiment, the receiving circuitry 610 can be configured to receive a configuration indicating that a preconfigured number of consecutive symbols within a slot are used for a sidelink transmission. For example, the preconfigured number can be between 7 and 14. In some embodiments, the receiving circuitry 610 can receive the configuration from a BS, and the configuration can be included in an RRC message or a MAC-CE, or signaled by DCI. In other embodiments, the receiving circuitry 610 can receive the configuration from a UE, and the configuration can be signaled by SCI. The receiving circuitry 610 can be further configured to receive the sidelink transmission over the preconfigured number of consecutive symbols. In some embodiments, the remaining symbols of the slot can be used for GPs. For example, the GP(s) can be located at the last symbol(s) of the slot. In some embodiments, the data transmission of the sidelink transmission located at the first symbol of the slot can be used for AGC. In other embodiments, the data transmission can include two symbols of S-PSS located at the second and third symbols of the slot and two symbols of S-SSS located at the fourth and fifth symbols of the slot. In various embodiments, the receiving circuitry 610 can be further configured to perform another sidelink transmission over the preconfigured number of consecutive symbols within the slot.

The processing circuitry 620 can be configured to process a data transmission of the sidelink transmission received over the preconfigured number of consecutive symbols within the slot. In some embodiments, the processing circuitry 620 can be further configured to perform an S-RSSI measurement on the data transmission of the another sidelink transmission at least excluding the PSFCHs.

In various embodiments according to the disclosure, the receiving circuitry 610 and the processing circuitry 620 can include circuitry configured to perform the functions and processes described herein in combination with software or without software. In various examples, the processing circuitry 620 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the processing circuitry 620 can be a central processing unit (CPU) configured to execute program instructions to perform various functions and processes described herein.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving, at a. user equipment (UE), a configuration dicating that a preconfigured number of consecutive symbols within a slot are used for a sidelink transmission;
   receiving from another UE the sidelink transmission over the preconfigured number of consecutive symbols within the slot; and
   processing a data transmission of the sidelink transmission received over the preconfigured number of consecutive symbols within the slot, wherein the slot is a sidelink data slot the method further comprises: performing another sidelink transmission over the preconfigured number of consecutive symbols within the slot, a data transmission to vet another UE of the other sidelink transmission including physical sidelink feedback channel (PSFCH) located at second and third to last symbols of the slot, and the method further comprises performinu a sidelink received signal strength indicator (S-RSSI) measurement on the data transmission of the slot at least excluding the PSFCH.

2. The method of claim 1, wherein remaining symbol(s) within the slot are used for guard period(s) (GP(s)) and located at last symbol(s) of the slot.

3. The method of claim 1, wherein the data transmission of the sidelink transmission located at a first symbol of the slot is used for automatic gain control (AGC).

4. The method of claim I, wherein the slot is a sidelink synchronization signal (SLSS) slat, and the data transmission includes two symbols of sidelink primary synchronization signal (S-PSS) located at second and third symbols of the slot and two symbols of secondary sidelink synchronization signal (S-SSS) located at fourth and fifth symbols of the slot.

5. The method of claim 1, wherein the other UE is the same as the yet another UE.

6. The method of claim 1, wherein the configuration is received from a base station (BS), and is included in a radio resource control (RRC) message or a media access control-control element (MAC-CE), or signaled by downlink control information (LACI).

7. The method of claim 1, wherein the configuration is received from the other UE, and signaled by sidelink control information (SCI).

8. The method of claim 1, wherein the preconfigured number is between 7 and 14.

9. An apparatus, comprising:
   receiving circuitry configured to receive a configuration indicating that a preconfigured number of consecutive symbols within a slot are used for a sidelink transmission, and receive the sidelink transmission over the preconfigured number of consecutive symbols within the slot; and
   processing circuitry configured to process a data transmission of the sidelink transmission received over the preconfigured number of consecutive symbols within the slot,
   wherein the slot is a sidelink data slot, the receiving circuitry is further configured to perform another sidelink transmission over the preconfigured number of consecutive symbols within the slot, a data transmission to yet another User Equipment (UE) of the other sidelink transmission including physical sidelink feedback channel (PSFCH) located at second and third to last symbols of the slot, and the processing circuitry is further configured to perform a sidelink received signal strength indicator (S-RSSI) measurement on the data transmission of the slot at least excluding the PSFCH.

10. The apparatus of claim 9, wherein remaining symbol (s) within the slot are used as guard period(s) GP(s)) and located at last symbol(s) of the slot.

11. The apparatus of claim 9, wherein the data transmission of the sidelink transmission located at a first symbol of the slot is used for automatic gain control (AGC).

12. The apparatus of claim 9, wherein the slot is a sidelink synchronization signal (SLSS) slot, and the data transmission includes two symbols of sidelink primary synchronization signal (S-PSS) located at second and third symbols of the slot and two symbols of secondary sidelink synchronization signal (S-SSS) located at fourth and fifth symbols of the slot.

13. The apparatus of claim 9, wherein the other UE is the same as the yet another UE.

14. The apparatus of claim 9, wherein the configuration is received from a base station (BS), and is included in a radio resource control (RRC) message or a media access control-control element (MAC-CE), or signaled by downlink control information (DCI).

15. The apparatus of claim 9, wherein the configuration is received from a UE, and is signaled by sidelink control information (SCI).

16. The apparatus of claim 9, wherein the preconfigured number is between 7 and 14.

\* \* \* \* \*